United States Patent [19]
Tague

[11] 3,732,793
[45] May 15, 1973

[54] CALIBRATED VARIABLE NEUTRAL DENSITY FILTER FOR A CAMERA

[76] Inventor: Patrick W. Tague, 2514-56th Avenue SW., Seattle, Wash. 98116

[22] Filed: Oct. 26, 1971

[21] Appl. No.: 192,525

[52] U.S. Cl. .....................95/1 R, 95/11 R, 350/159, 350/111
[51] Int. Cl. ...............................................G02b 5/30
[58] Field of Search .............................95/1 R, 11 R; 350/159, 111, 147

[56] References Cited

UNITED STATES PATENTS

| | | | |
|---|---|---|---|
| 2,145,914 | 2/1939 | Bartels | 350/159 X |
| 2,825,271 | 3/1958 | McKae | 350/159 X |

FOREIGN PATENTS OR APPLICATIONS

| | | | |
|---|---|---|---|
| 38/9230 | 6/1963 | Japan | 350/159 |

Primary Examiner—Robert P. Greiner
Attorney—Richard W. Seed

[57] ABSTRACT

A calibrated neutral density filter has two polarizing filter members mounted in filter ring supports for rotation relative to one another. Indicia on the filter supports relate the degree of rotation of the two polarizing filter members relative to each other as a function of f:stop. An outer concentric ring mounted for rotation over the filter support has indicia printed thereon corresponding to f:stop graduations on the filter support. A reference point on the filter support indicates the f:stop correction necessary because of reduction of intensity of light through the two polarizing filter members. Setting of a predetermined f:stop reading on the concentric ring to the reference point indicates the corrected f:stop reading for the camera for any degree of rotation of the polarizing filters relative to each other.

3 Claims, 3 Drawing Figures

PATENTED MAY 15 1973 3,732,793
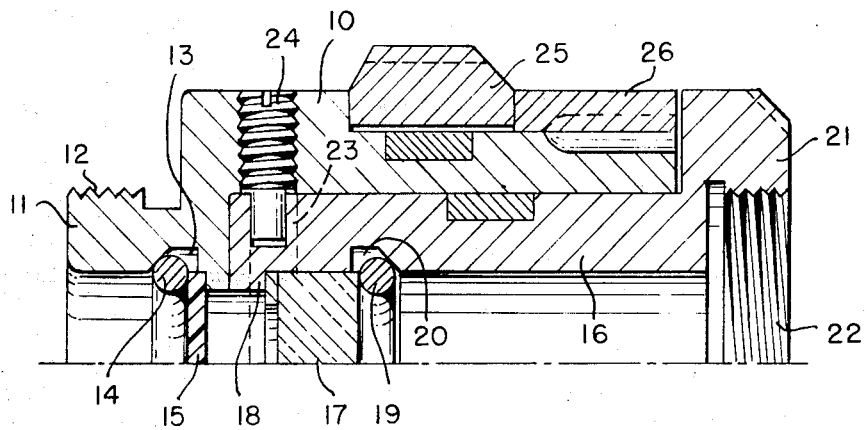
FIG. 2
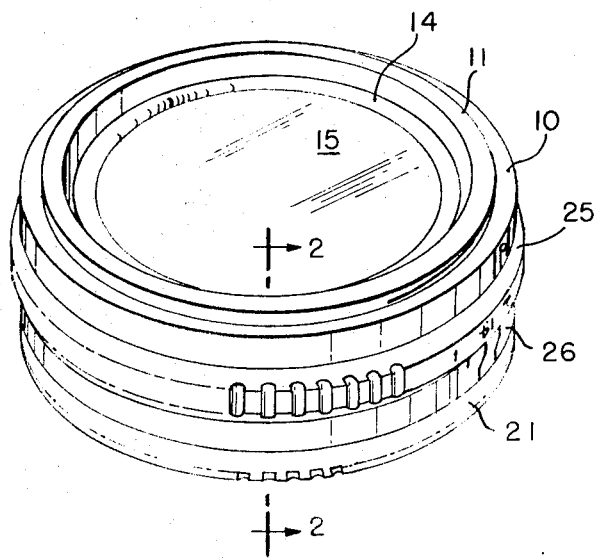
FIG. 1
FIG. 3
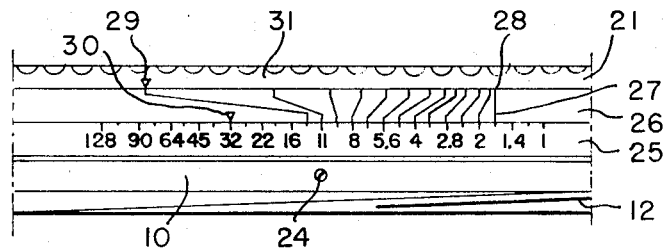

CALIBRATED VARIABLE NEUTRAL DENSITY FILTER FOR A CAMERA

BACKGROUND OF THE INVENTION

1. Field of the Invention

This invention relates to a calibrated variable neutral density filter and method of its use in photography.

2. Prior Art Relating to the Disclosure

Polarizing filters composed of two superimposed polarizing screens, one rotatable relative to the other, are known and used in both color and black and white photography. These type filters are of limited value; however, in that a great deal of trial and error are necessary to determine the correct f:stop reading for a particular condition of the polarizing filter screens.

BRIEF DESCRIPTION OF THE DRAWINGS

FIG. 1 is a perspective view of the variable neutral density filter of this invention;

FIG. 2 is a partial vertical cross-sectional view through the variable neutral density filter of this invention; and FIG. 3 illustrates the calibration of the variable neutral density filter of this invention.

SUMMARY OF THE INVENTION

The object of this invention are to provide a calibrated neutral density filter which (1) is equally useful for color and black and white photography; (2) stops glare; (3) extends the useful range of film having a high ASA rating; (4) creates an alternative choice for the user from shutter speed and f:stop corrections; (5) retains extra color clarity; (6) allows a greater depth of field control; (7) is easy and inexpensive to manufacture; and (8) is of novel construction.

The variable neutral density filter comprises (1) a first filter ring support having a polarizing filter member mounted therein and adapted to be secured over the lens of a camera, (2) a second filter ring support rotatably secured to the first support having a polarizing filter member mounted therein, (3) indicia on the first and second filter supports relating the degree of rotation of the two polarizing filter members relative to each other as a function of f:stop, (4) an outer concentric ring mounted for rotation over the first filter support having indicia thereon corresponding to f:stop readings and (5) a reference point on the first filter support indicative of the f:stop correction necessary because of reduction of intensity of light through the two polarizing filters when the polarizing filters are positioned to allow maximum light accessibility therethrough, whereby setting of a predetermined f:stop on the outer ring to the reference point indicates the corrected f:stop reading for the camera for any degree of rotation from maximum to minimum light accessibility of the polarizing filter members relative to each other.

DESCRIPTION OF THE PREFERRED EMBODIMENTS

FIG. 2 illustrates a partial vertical cross-sectional view through the variable density filter of this invention. The first filter support includes a first annular body 10 having a flange 11 extending outwardly therefrom, the flange having threads 12 on the outer circumference thereof for attachment to a conventional series adapter ring, the adapter ring attached to the camera lens. An inner circumferential recess 13 holds a retainer ring 14 which holds the polarizing filter member 15 therein. The polarizing filter may be of a plastic material or glass.

A second annular body is rotatably fitted within the first annular body of the first filter ring support as illustrated. A polarizing filter member 17 of plastic, glass or glass over plastic is mounted within the second annular body and rests against an inwardly projecting shoulder 18 and is retained therein by retainer ring 19 disposed in an inner circumferential recess 20 of the second annular body. An outwardly extending flange 21 of the second annular body is provided with threads 22 on the inner circumference thereof for securing other attachments to the variable neutral density filter. A slot 23 in the second annular body extends around the circumference thereof approximately 90°. Directly above the slot is a threaded opening in the first annular body 10 for receiving two set screws 24, one at each end of the slot. The set screws, when screwed into place, prevent rotation of the second annular filter support relative to the first greater than the length of the circumferential slot or about 90°. Mounted for rotation over the annular body 10 is an outer concentric ring 25 having indicia printed thereon as will be discussed later. This outer concentric ring may be of metal or plastic as desired. A band 26 abuts the forward edge of the concentric ring and is provided with calibrated indicia as will be discussed. The band 26 is locked in fixed position relative to annular body 10 by a locking pin 21. Flat springs 32 and 33 are mounted as illustrated in FIG. 2 to provide some frictional resistance against turning of body 10 relative to body 16 and body 10 relative to concentric ring 25.

The filter of this invention may be calibrated in various ways. A convenient way of calibrating the filter is to provide a steady source of light through the filter with the two polarizing filters positioned for full light accessibility through the two filters. The light intensity through the filters is recorded by photometer, a conventional exposure meter or other means. Conveniently an exposure meter is used to calibrate the filter in terms of f:stop graduations. After recording the light intensity through the two polarizing filters at full light accessibility, one of the filters is rotated relative to the other to decrease the light intensity therethrough. The filter may be calibrated, for example, in terms of ½ f:stops; that is, ½ f:stop reductions in light intensity between each of the calibrations.

FIG. 3 illustrates the manner of calibration of the variable neutral density filter of this invention and use of the calibrations. The values chosen for purposes of illustration and description herein are a matter of choice and may be changed or varied without departing from the spirit of the invention. As illustrated, the outer concentric ring 25 has f:stop indicia imprinted thereon ranging from f:1 to f:128 with half f:stop graduations indicated. The graduations of ½ f:stop correspond to the graduations 27 on the inner circumference of ring 26. The lines extending from each of these half-stop graduations on ring 26 lead to outer graduations 28 which reference the relative rotation of the polarizing filter members to each other corresponding to the ½ f:stop graduations.

The reference point 29 on the annular body of the second filter support member indicates the degree of rotation of the second polarizing filter relative to the first polarizing filter. In the position indicated in FIG.

3 the two polarizing filters are positioned for maximum light accessibility therethrough.

The reference point 30 on the annular ring 26 indicates, in terms of f:stop, the loss of light intensity through the two polarizing filters. As indicated the loss of light intensity is about 2½ f:stop. This correction factor will vary depending on the polarizing filters used and can be ascertained readily by one skilled in the art. It represents, in effect, the difference in light intensity reaching the lens of the camera with and without the variable neutral density filter mounted over the lens.

To use the variable neutral density filter it is first attached to the camera lens by the use of a conventional series adapter ring. A conventional exposure meter is used to obtain the f:stop reading for a particular shutter speed. For example, if the f:stop reading obtained from the exposure meters is f:32, the concentric ring 25 is rotated to place f:32 opposite reference point 30. With the reference point 29 in the position indicated in FIG. 3, that is at full light accessibility, the f:stop correction for the camera is about halfway between f:11 and f:16. The polarizing filter of the second filter support is then rotated relative to the first filter support a desired amount, for example, to the position indicated by reference numeral 31. In this position the f:stop reading to be set on the camera would be f:11 as read on the concentric ring 25. This f:stop value is set on the camera and the photograph taken. The degree of rotation of the filter members relative to one another for a particular photograph is dependent on the lighting conditions and the glare which it is desired to eliminate.

One of the principal advantages of the variable neutral density filter of this invention is extension of the useful range of films having relatively high ASA ratings, for example, color film having an ASA rating of 3,000 or black and white film having an ASA rating of 4,000. Normally, such film cannot be used except indoors or outdoors under dimly lit conditions. For sunny outdoor pictures, such film is much too fast. However, with the variable neutral density filter of this invention film having these high ASA ratings can be used with no problem. Setting of the filter in the manner described above compensates and reduces the light intensity such that out of doors pictures can be taken without loss of clarity, faithful photographic rendition of all colors, if color film is used, and elimination of glare and other photographic difficulties.

The claims of this invention are:

1. A calibrated variable neutral density filter adapted to be secured over the lens of a camera, comprising:
   a first filter ring support having a polarizing filter member mounted therein, the filter ring support adapted to be secured to the lens of a camera,
   a second filter ring support rotatably secured to the first support having a polarizing filter member mounted therein,
   indicia on the first and second filter supports relating the degree of rotation of the two polarizing filter members relative to each other as a function of f:stop,
   an outer concentric ring mounted for rotation over the first filter support having indicia thereon corresponding to the f:stop readings on the first filter support, and
   a reference point on the first filter support indicative of the f:stop correction necessary because of reduction of light intensity through the two polarizing filters;
   whereby setting of a predetermined f:stop on the outer ring to the reference point indicates the correct f:stop reading to be set on the camera for any degree of rotation of the polarizing filters relative to each other.

2. The filter of claim 1 wherein the first filter support includes (a) an annular body having an extended flange threaded on the outer circumference thereof for securing to a conventional adapter ring, (b) an inner circumferential recess for receiving the polarizing filter, (c) retaining means disposed in the recess to retain the polarizing filter;
   wherein the second filter support includes (a) a second annular body mounted for rotation within the first annular body, (b) a circumferential recess therein for receiving a polarizing filter, (c) retaining means disposed in the recess to retain the polarizing filter and (d) an outwardly extending flange threaded on the inner circumference thereof for securing a lens attachment thereto.

3. A method of employing a calibrated neutral density filter in taking photographs, the neutral density filter including (1) a first filter ring support having a polarizing filter member mounted therein, (2) a second filter ring support rotatably secured to the first filter support having a polarizing filter member mounted therein, (3) indicia on the first and second filter supports relating the degree of rotation of the two polarizing filter members relative to each other as a function of f:stop, (4) an outer concentric ring mounted for rotation over the first filter support having indicia thereon corresponding to the f:stop readings on the first filter support, and (5) a reference point on the first filter support indicative of the f:stop correction necessary because of reduction of light intensity through the two polarizing filters, the method comprising:
   a. obtaining an f:stop reading for the particular shutter speed desired,
   b. adjusting the outer concentric ring of the filter so that the f:stop reading obtained is set opposite the reference point,
   c. rotating the second polarizing filter relative to the first to a desired position, and
   (d) setting the camera to the corrected f:stop reading on the outer concentric ring for the degree of rotation of the second polarizing filter.

* * * * *